(12) United States Patent
Aoki et al.

(10) Patent No.: US 6,433,932 B1
(45) Date of Patent: Aug. 13, 2002

(54) SOLAR LIGHTING APPARATUS

(75) Inventors: Hideaki Aoki, Kyoto; Kenji Taguchi, Hirakata, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 66 days.

(21) Appl. No.: 09/630,551

(22) Filed: Aug. 1, 2000

(30) Foreign Application Priority Data

Apr. 28, 2000 (JP) ......................................... 2000-128715

(51) Int. Cl.[7] ........................ G02B 27/00; G02B 17/00; G02B 5/08; G02B 5/10; G03B 21/00

(52) U.S. Cl. ........................ 359/597; 359/591; 359/853; 359/851; 353/3

(58) Field of Search ................................. 359/591, 597, 359/853, 851; 353/3

(56) References Cited

U.S. PATENT DOCUMENTS 4,129,360 A * 12/1978 Deflandre et al. .......... 359/853
5,493,824 A *  2/1996 Webster et al. ............... 52/200
5,999,323 A * 12/1999 Wood ......................... 359/591

* cited by examiner

*Primary Examiner*—Christopher Mahoney
*Assistant Examiner*—Magda Cruz
(74) *Attorney, Agent, or Firm*—Arent Fox Kintner Plotkin & Kahn

(57) ABSTRACT

A solar lighting apparatus includes a transparent dome. The transparent dome is provided, at its ceiling center, with a control box accommodating a stepping motor, a controller for controlling the motor and a secondary battery. The stepping motor has a motor shaft coupled with a rotary shaft. On the rotary shaft is coupled a support frame member through a universal joint. The rotary shaft is driven by the motor to turn a reflection mirror held on the support frame member over a predetermined angle while tracking the sun.

10 Claims, 4 Drawing Sheets

SOLAR LIGHTING APPARATUS

BACKGROUND OF THE INVENTION

1. Field of the Invention

This invention relates to solar lighting apparatuses and, more particularly, to a solar lighting apparatus having, within a transparent dome, a rotatively-driven reflection mirror to reflect solar light to be introduced into an inside of a building.

2. Description of the Prior Art

In the building such as a house, direct lighting with solar light is possible only to the room opening on an outside. An aperture such as top lighting or vertical well is provided in a center or north part of the building. Thus, solar light is supplied through the aperture to an inside of the building thus supplying light to the inside.

In the aperture, a solar lighting apparatus is installed which has a reflection mirror to be controlled in inclination angle depending upon a position of the sun. The solar light reflected by the reflection mirror is then introduced into the building.

The solar lighting apparatus has a transparent dome having therein a lighting apparatus having a rotatable reflection mirror to allow tracking a position of the sun. The rotatable reflection mirror has a plurality of reflection plates arranged in a cantilever form at a predetermined interval on a support member structured by rolled members, such as angles. The rotatable reflection mirror has a rotary shaft at its center. The rotatable reflection mirror is coupled, in a state directed upward and cantilever-supported, to a rotary drive shaft (see, e.g. the Specification and Drawings of U.S. Pat. No. 5,999,323).

Meanwhile, separately provided are the motor and drive gear arrangement for driving the rotary drive shaft and its control circuit. These are connected through wiring laid in the transparent dome.

In the meanwhile, the rotatable reflection mirror is in a cantilever structure on the support member, as mentioned above. In order to rigidly support the reflection plates (also in cantilever-supported), there is a need of employing structural members in a sectional form having high strength. This however results in increase of weight.

Furthermore, because no consideration is given to provide balance of weight in the rotary shaft part, bending moment is applied at all times to the rotary shaft. Accordingly, high rotational torque is required in driving the rotatable reflection mirror. This in turn requires a high-output drive motor and an increased-capacity power supply.

SUMMARY OF THE INVENTION

Therefore it is a primary object of the present invention to provide a novel solar lighting apparatus.

Another object of the invention is to provide a solar lighting apparatus capable of rotating the reflection mirror by a small-sized drive motor.

The present invention is a solar lighting apparatus, comprising: a dome formed of a transparent material; a support member suspended in the dome; a mirror held fixedly on the support member; and a motor for rotating the support member through a rotary shaft.

In this invention, the mirror is held on the support member suspended in the transparent dome. Because the support member is turned by the motor through the rotary shaft, the mirror is allowed to turn tracking the sun thus obtaining efficient lighting with reflection light. Meanwhile, because the support member holding the mirror is suspended in the dome, bending moment is eliminated to reduce drive torque without changing rotational moment. Accordingly, the suspension of the supporting member in the dome eliminates bending moment, thereby reducing drive torque.

Meanwhile, the support member if preferably structured by connecting light-weighted metal pipes reduces the total weight of the apparatus with the rigidity increased. If the support member is made by a plurality of aluminum pipes connected through detachable joints, it is possible to transport in a compact state of disassembling the aluminum pipes to an installation site.

Furthermore, if the support member and the rotary shaft for rotating the support member are coupled by a universal joint, bending moment is eliminated from a rotary part. Further, rotation drive torque can be reduced in addition to the reduction in weight of the support member. As a result, electric energy for driving the motor is to be saved.

According to the present invention, the drive force required for rotating the mirror is reduced and hence an energy-saving effect is expectable.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
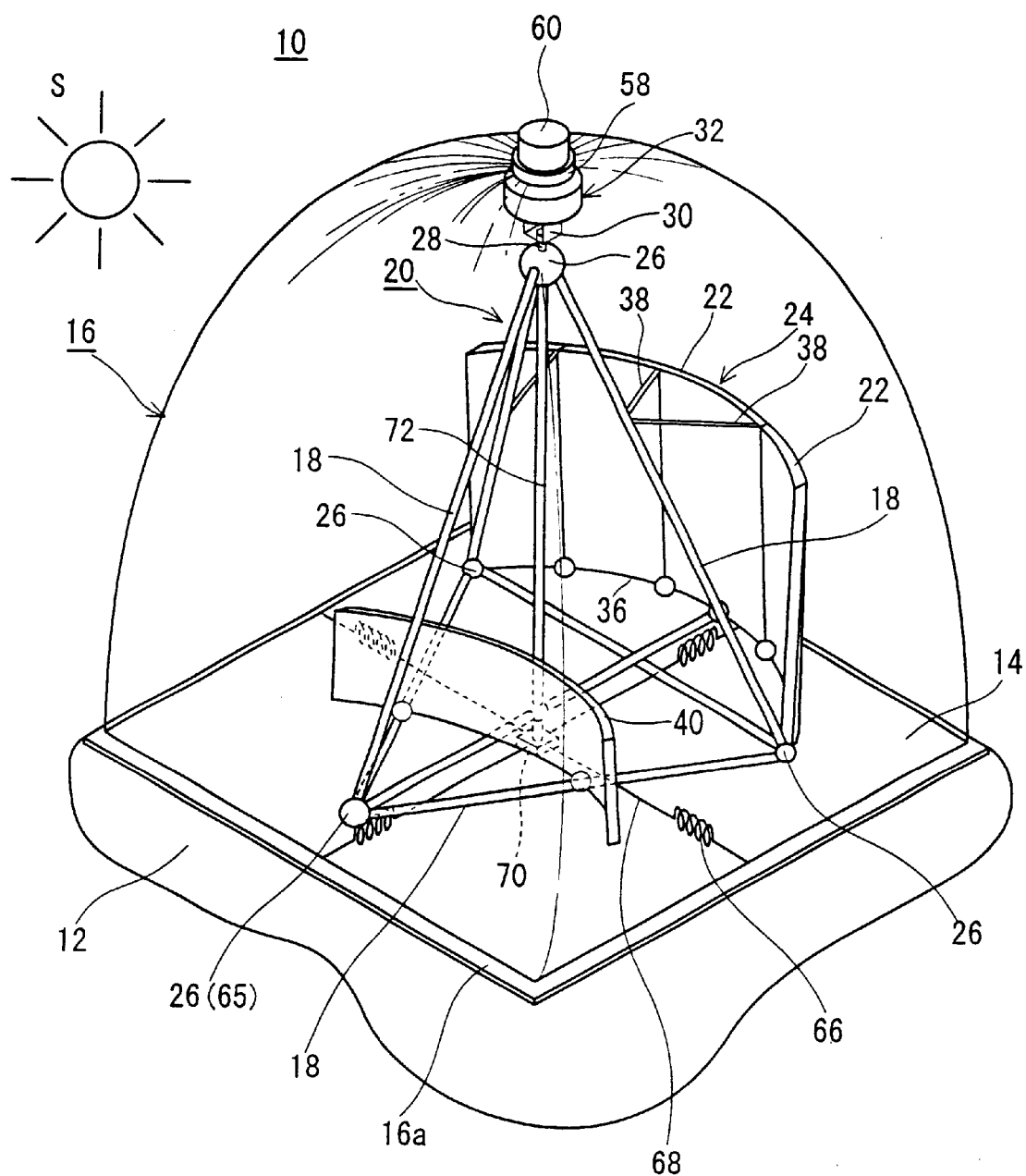
FIG. 1 is a perspective view showing a schematic structure of a solar lighting apparatus according to one embodiment of the present invention.
Figure 2:
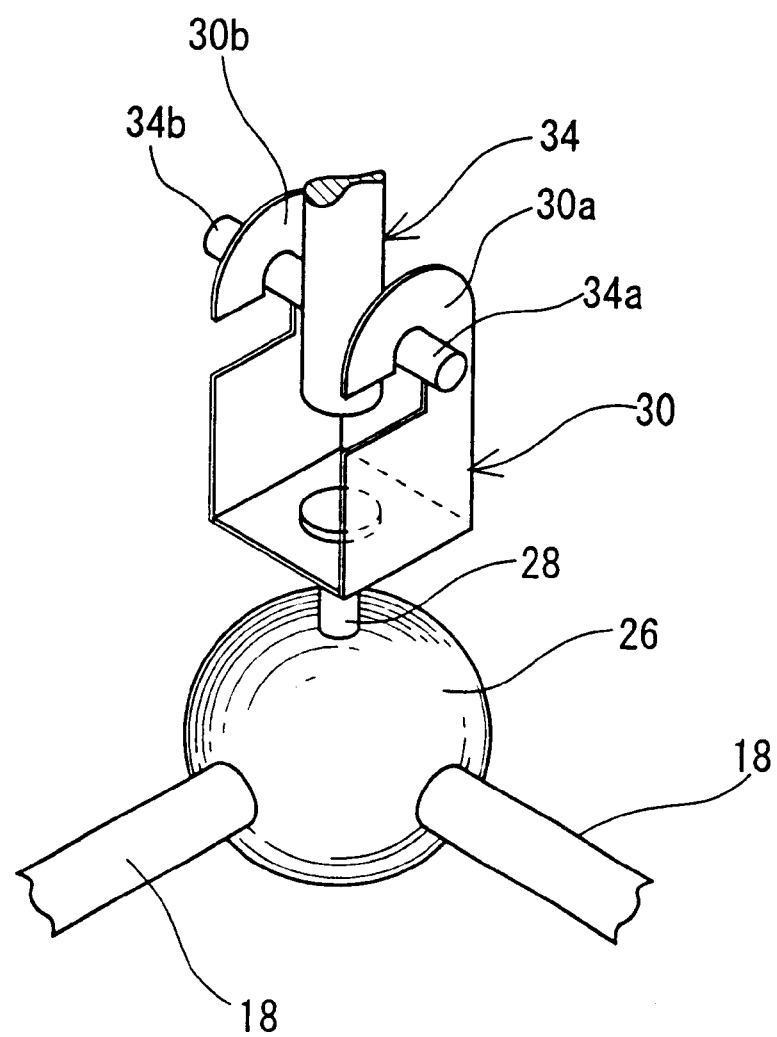
FIG. 2 is an illustrative view showing a suspender of FIG. 1.

A solar lighting apparatus 10 as one embodiment of the invention shown in FIG. 1 is set up at a lighting aperture 14, such as a top lighting or vertical well, provided in a building 12, e.g. a house. The solar lighting apparatus 10 includes a transparent dome 16 having a mounting flange 16a for fixing by screws or the like on a mount frame 15 in a manner covering the lighting aperture 14, a support frame member 20 arranged in a suspension state in the dome 16 and structured by connecting light-weighted rolled members 18, 18, . . . such as thin-walled aluminum pipes, and a reflection mirror 24 having a plurality of flat plates or reflection panels having secondary curved surfaces 22, 22, . . . mounted on the support frame member 20.

The transparent dome 16 is formed by working a transparent acrylic or polycarbonate resin plate having an even thickness of approximately 3 to 5 mm. The aperture 14 in this embodiment is in a square (rectangular) form having a side length of approximately 120 cm. Alternatively, it may be in circular if required. In such a case, the transparent dome 16 should be changed in form from the dome shape adapted for the squared aperture 14 to a semi-spherical form. Incidentally, although the transparent dome 16 is structured by a transparent acrylic resin plate or the like as above, a reinforcement rib (not shown) may be provided at an inner side thereof as required. For the dome 16, external air is prevented from entering through the aperture 14 to the indoor. Meanwhile, the reflection mirror 24, etc. are prevented from being contaminated with dusts.

The support frame member 20 is formed generally in a triangular pyramidal form by the connection of six thin-walled aluminum pipes 18, 18, . . . and has junctions coupled with spherical joints 26. Each of these joints 26, although not shown, has a required number of insertion holes or projections for insertion by the pipe 18. Meanwhile, the joint 26 positioned at a top of the support frame member 20 has a suspender 30 fixed through a support shaft 28. This suspender 30 has a pair of hooks 30a, 30b for engagement with support pins 34a, 34b of the rotary shaft 34 having a drive control unit 32 to be positioned at a ceiling center (top) of the dome 16, thus constituting a universal joint. This structure allows a support frame member 20 to be rotatively supported in a suspension state in the dome 16.

The universal joint eliminates bending moment occurring at the rotary part, thereby reducing drive torque required. Incidentally, although the support frame member 20 in this embodiment is formed generally in the triangular pyramidal form, it may be formed generally in a square pyramidal form as another embodiment. Also, the support frame member 20 may be in other arbitrary forms besides the squared pyramid. Furthermore, although the support frame member 20 in this embodiment is coupled to the rotary shaft 34 through the universal joint mechanism, the support member may be directly fixed on a rotary shaft of a motor 42 (described later).

Meanwhile, the reflection mirror 24 fixedly supported on the support frame member 20 is structured, for example, by a combination of reflection panels 22 each having a secondary curved surface. Each reflection panel 22 in a lower edge is supported by an arcuate support member 36 having respective ends fixed by the joints 26, 26 on the thin-walled aluminum pipe forming a bottom of the support frame member 20. The reflection panel 22 in an upper edge is supported by the thin-walled aluminum pipes 18, 18 forming a side plane of the support frame member 20 through a support pipe 38.

An auxiliary reflection mirror 40 having a secondary curved surface is provided in the vicinity of a bottom center of the support frame member 20. This auxiliary reflection mirror 40 is provided, spaced by a predetermined spacing, in front of the reflection mirror 24 in order to increase the efficiency of lighting of radiation light of the sun S. The auxiliary reflection mirror 40 has a height dimension set low such that the auxiliary reflection mirror 40 will not shield the solar S radiation light from reaching the reflection mirror 24.

Incidentally, the reflection mirror 24 and the auxiliary reflection mirror 40 may be structured with one flat reflection panel. Meanwhile, the reflection panel 22 in a flat plate or secondary curved surface form can be formed, for example, by laminating on a light-weighted polystyrene plate a resin film having a mirror-like surface formed by aluminum evaporation.

Figure 3:
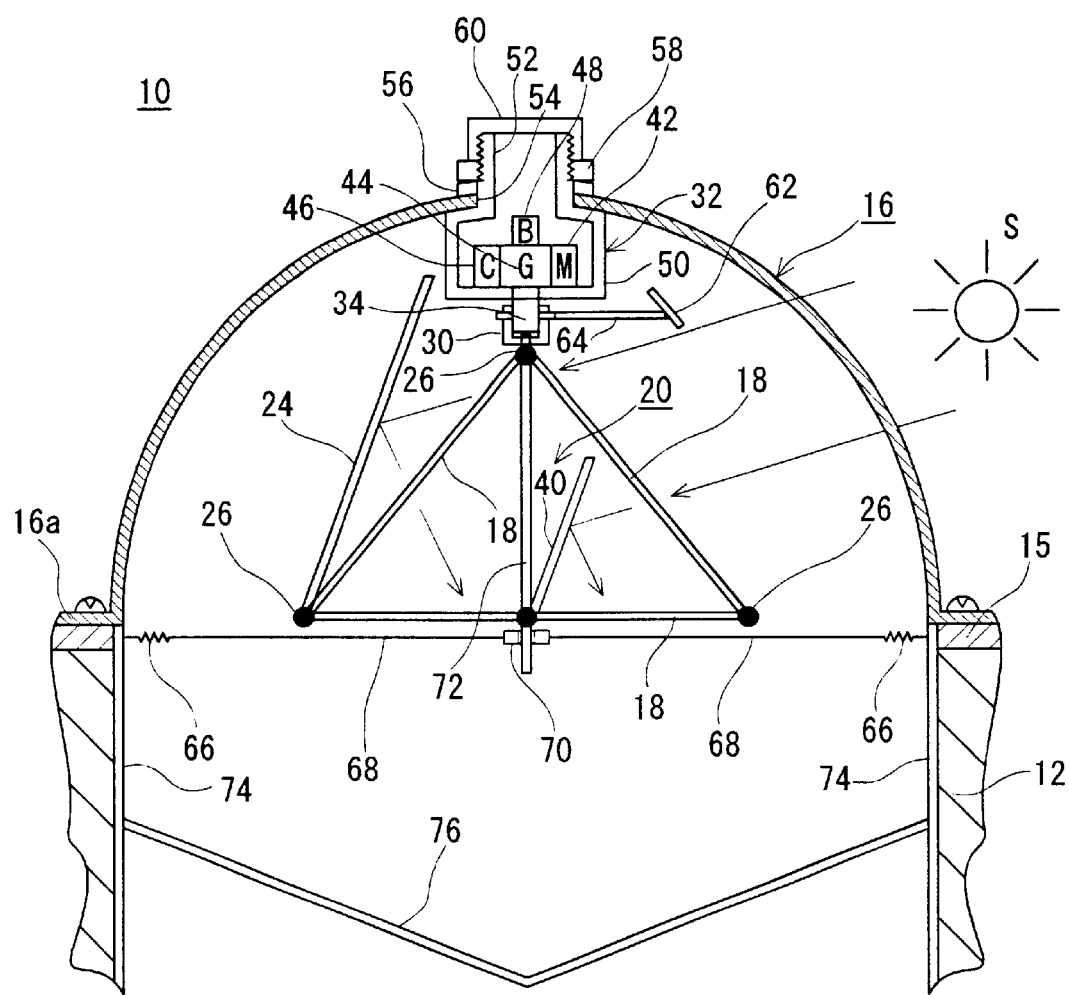
FIG. 3 is an illustrative view in section of an essential part of another embodiment of the invention.

The drive control unit 32 includes, as shown in FIG. 3, a stepping motor 42, a drive gear 44 for delivering a rotation force of the motor 42 to the rotary shaft 34, a controller (including a micro-computer) for controlling rotation of the motor 42 and a battery 48 for supplying power to the motor 42 and controller 46. These are all accommodated in a control box 50.

The control box 50 has a cylindrical opening 52 formed with a helical part on an outer periphery thereof. This cylindrical opening 52 is inserted in a mount hole 54 formed at a ceiling center (top) of the transparent dome 16. Through an annular packing 56 a fixing nut 58 is screwed to the helical part, thereby fixing the control box 50 in the transparent dome 16. Also, a water-preventing lid 60 for opening and closing is attached on an opening end of the cylindrical opening 52. The opening and closing the lid 60 as required allows for inspection and repair of the above parts accommodated within the box 50 from an outside of the dome 16 and positional adjustment of the support frame member 20 including the rotary shaft 34. For example, it is possible to open the water preventing lid 60 from the outside of the dome 16 to inspect or exchange the battery 48 accommodated in the controlled box 50.

Also, the drive gear 44 uses a bevel gear mechanism of a reduction speed type capable of converting a rotational force about a horizontal axis of the motor 42 into a rotational force about a vertical axis. This causes the reflection mirror 22 and auxiliary reflection mirror 40 supported on the support frame member 20 to turn once per day (360°/24 H=15°/H) in accordance with a position of the sun S. For this purpose, it is possible to use a timer function of a controller including a micro-computer or a timepiece movement as a drive control unit 32.

For example, by a pulse signal from the controller 46 including a micro-computer, the stepping motor 42 is turned over a predetermined angle. The rotatable drive force of the stepping motor 42 rotates the support frame member 20 over a predetermined angle thereby rotating a predetermined angle the reflection mirror 24 and auxiliary reflection mirror 40 supported on the support frame member 20. As a result, the reflection mirror 24 and auxiliary reflection mirror 40 are controlled of drive to a direction toward the sun S.

Incidentally, the sun S is different in position depending upon a regional latitude, season of the year and time of the day. However, if values throughout the year of a region where a building 12 such as a house having the solar lighting apparatus 10 exists are previously stored in a micro-computer, the reflection mirror 24, etc. can be controlled in rotation based on that data according to the movement of the sun S. This will be described later.

Meanwhile, the battery 48 in this embodiment is a secondary battery. Furthermore, the rotary shaft 34 is fixed with a support member 64 provided with a solar battery panel 62 on one of the support pins 34a, 34b. Because this solar battery panel 62 is fixed to the rotary shaft 34 through the support member 64, it tracks the sun S thus performing solar power generation with efficiency. The electric power obtained on the solar battery panel 62 is charged to the second battery 48.

It is noted that commercial power supply, in place of the secondary battery 48, can be used as a power source to the motor 42 and controller 46.

Furthermore, a proper balancer (ballast) 65 is provided on the support frame member as required, in order to horizontally balance the support frame member 20 suspended by the rotary shaft 34 of the drive control unit 32 in a state of mounting the reflection mirror 24 and auxiliary reflection mirror 40. This balancer 65 in this embodiment serves also as the joint 26. Also, in order to prevent against swinging due to rotation, a pivotal hole part is provided at a lower center in the transparent dome 16, i.e. resiliently supported on a rotation axis through coil springs 66 and wires 68 to respective side centers of a rectangular mount frame 15 in the aperture 14. In this pivotal hole part 70 is inserted a lower end of a center support member (rotation center axis) 72 fixed on the support frame member 20.

Figure 4:
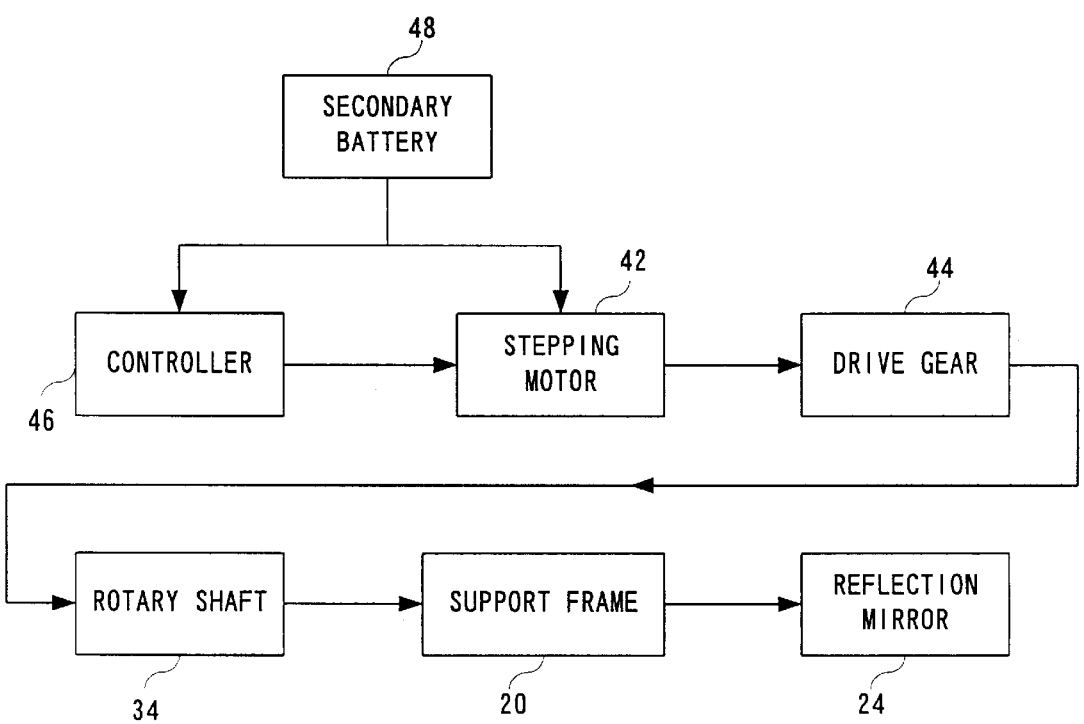
FIG. 4 is a block diagram showing a rotary drive mechanism of the one embodiment of the invention.

Next, the operational outline of the solar lighting apparatus 10 as the one embodiment of the invention will be explained with reference to FIG. 3 and FIG. 4.

First, a power switch, not shown, is turned on to feed electricity from the secondary battery 48 of the drive control unit 32 to the stepping motor 42 and controller 46. The support frame member 20 suspended in the transparent dome 16 is rotated by 180 degrees on the rotary shaft 34 by reducing, through the drive gear 44, rotation of the stepping motor 42 controlled in rotation by the controller 46, for a duration of from sunrise to sunset, e.g. for 12 hours of from 6 AM to 6 PM. This reduction of rotation causes the reflection mirror 24 and auxiliary reflection mirror 40 supported on the support frame member 20 to rotate over a predetermined angle depending upon a position of the sun S.

The solar radiation light reflected upon the reflection mirror 24 and auxiliary reflection mirror 40 is incident on the aperture 14 as shown by the solid-lined arrows in FIG. 3. The light is further reflected at an entrance to the aperture forming a mirror-like surface 74 and then transmitted through the light diffusion plate 76 thereby illuminating the indoor.

The support frame member 20 further rotates by 180 degrees for 12 hours of from 6:00 PM after sunset to 6:00 AM in the tomorrow morning. Due to the rotation, the reflection mirror 24 and auxiliary reflection mirror 40 makes one turn returning to the former position. Thereafter, operation is repeated similarly.

As explained above, by accommodating the drive control unit 32 within the control box 50 into a unit form, it is possible to reduce the number of parts and assembling processes thereby reducing cost and decreasing the mechanism exposure hence improving reliability. Furthermore, required maintenance and inspection is made easy to carry out.

The azimuth/altitude of the sun, as stated before, is to be determined by the following Equations.

$$\tan A = \frac{-\cos\delta \cdot \sin t}{\sin\delta \cdot \cos\psi - \cos\delta \cdot \sin\psi \cdot \cos t} \quad \text{[Equation ①]}$$

$$\sin h = \sin\delta \cdot \sin\psi + \cos\delta \cdot \cos\psi \cdot \cos t \quad \text{[Equation ②]}$$

A: azimuth h: altitude

δ: solar declination (calculated from Equation (②))

ψ: latitude at observation (input value)

t: solar hour angle (t=Θ−α, Θ: sidereal time, α: declination (calculated from Equation ⑩))

where the azimuth A in north is taken 0° to increase the angle in a direction as north→east→south→west. Incidentally, the quadrant of azimuth A is determined by the following relationship.

TABLE 1

Determining Azimuth Quadrant

| | |
|---|---|
| Positive in denomination of Equation ① | −90° < A < 90° |
| Negative in denomination of Equation ① | 90° < A < 270° |
| Zero in denomination of Equation ① | |
| sin t > 0 | A = −90° |
| sin t < 0 | A = 90° |
| sin t = 0 | h = 90° A not constant |

When minus in the denominator, a correct value A is obtainable by adding 180° to a value A calculated with an inverse trigonometric function $\tan^{-1}$.

Next, calculations are made to determine parameters of Equations ① and ②.

First, an altazimuth Julian year T and a sidereal time Θ are calculated from J2000.0 (Jan. 1, 2000 noon in dynamical-time). It is herein assumed that, in a region an observation point is located, a time differential is I hours and the observation point is at a longitude of λ.

Provided that, in this site point, a lapse of days is K' from J2000.0 to (2000+Y)/Mth month/Dth day/0 o'clock (in local time), $$K'=365Y+30M+D-33.5-I/24+[3(M+1)/5]+[Y/4] \quad \text{[Equation ③]}$$

Where [ ] means a Gauss notation representing a maximum integer of not exceeding a numeral within [ ]. Also, for January and February, calculations are made as 13th month and 14th month of the preceding year. For example, for Feb. 14, 2001, calculation will be as 2000/14th month/14th day.

Using K', determined is an altazimuth Julian year is T to (2000+Y)/Mth month/Dth day/G o'clock/m minute (in local time). Then, we obtain:

$$T=(K'+G/24+m/1440+\Delta T/86400)/365.25 \quad \text{[Equation ④]}$$

Note that ΔT represents a delay of earth rotation in second at a time of calculation, and it may be:

ΔT=65 (seconds).

From this, a solar longitude λs is determined.

$$\begin{aligned}\lambda_S =\ & 280°.4603 + 360°.00769T + \\ & (1°.9146 - 0°.0005T)\sin(357°.538 + \\ & 359°.991T) + \\ & 0°.0200\sin(355°.05 + 719°.981T) + \\ & 0°.0048\sin(234°.95 + 19°.341T) + \\ & 0°.0020\sin(247°.1 + 329°.64T) + \\ & 0°.0018\sin(297°.8 + 4452°.67T) + \\ & 0°.0018\sin(251°.3 + 0°.20T) + \\ & 0°.0015\sin(343°.2 + 450°.37T) + \\ & 0°.0013\sin(81°.4 + 225°.18T) + \\ & 0°.0008\sin(132°.5 + 659°.29T) + \\ & 0°.0007\sin(153°.3 + 90°.38T) + \\ & 0°.0007\sin(206°.8 + 30°.35T) + \\ & 0°.0006\sin(29°.8 + 337°.18T) + \\ & 0°.0005\sin(207°.4 + 1°.50T) + \\ & 0°.0005\sin(291°.2 + 22°.81T) + \\ & 0°.0004\sin(234°.9 + 315°.56T) + \\ & 0°.0004\sin(157°.3 + 299°.30T) + \\ & 0°.0004\sin(21°.1 + 720°.02T) + \\ & 0°.0003\sin(352°.5 + 1079°.97T) + \\ & 0°.0003\sin(329°.7 + 44°.43T)\end{aligned} \quad \text{[Equation ⑤]}$$

Also, an ecliptic inclination angle ε is to be determined by the following Equation.

$$\epsilon=23°.439291-0°.000130042T \quad \text{[Equation ⑥]}$$

From this a solar right-ascension and declination are determined as follows:

$$\tan\alpha=\tan\lambda_S\cdot\cos\epsilon \quad (\alpha: \text{right-ascension}) \quad \text{[Equation ⑦]}$$

$$\sin\delta=\sin\lambda_S\cdot\sin\epsilon \quad (\delta: \text{declination}) \quad \text{[Equation ⑧]}$$

α and λs are in a same quadrant at all times.

When $0° \leq \lambda s < 180°$, $0° \leq \alpha 180°$

When $180° \leq \lambda s < 360°$, $180° \leq \alpha < 360°$

Meanwhile, a sidereal time $\Theta$ is determined from the following Equation.

$$\Theta = 100°.4606 + 360°.007700536 \cdot T + 0°.00000003879 \cdot T^2 - 15° \cdot I + \lambda + 360° \cdot d \quad \text{[Equation 9]}$$

$\lambda$: longitude at observation site (plus in east longitude)

d: value in day decimal of a lapse of days from 0 o'clock in local time (e.g. 14 o'clock is given as d=14/24)

From Equations ⑦ and ⑨, a solar hour angle is determined as follows:

$$t = \Theta - \alpha \quad \text{[Equation 10]}$$

By the above, the parameters required to calculate Equations ① and ② are calculated.

Therefore, a solar azimuth and altitude at that time can be determined by providing (2000+Y)/Mth month/Dth day/G o'clock/m minute, latitude and longitude at the observation site point.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solar lighting apparatus, comprising:
    a dome formed of a transparent material;
    a support member suspended in said dome;
    a mirror held fixedly on said support member; and
    a motor for rotating said support member through a rotary shaft.

2. A solar lighting apparatus according to claim 1, further comprising a universal joint coupling between said support member and said rotary shaft.

3. A solar lighting apparatus according to claim 2, wherein said universal joint includes a hook to engage said support member with said rotary shaft.

4. A solar lighting apparatus according to any of claims 1 to 3, wherein said support member is structured by a light weighted pipe.

5. A solar lighting apparatus according to claim 4, wherein said support member includes a plurality of pipes and joints for detachably connecting said pipes.

6. A solar lighting apparatus, comprising:
    a dome formed of a transparent material;
    a control box fixed at a top of said dome;
    a motor provided in said control box and having a motor shaft;
    a controller provided in said control box and controlling said motor;
    a rotary shaft coupled to said motor shaft and provided vertically extending from said control box;
    a support frame member attached to said rotary shaft; and
    a reflection mirror provided on said support frame member.

7. A solar lighting apparatus according to claim 6, further comprising a universal joint for coupling said support frame member to said rotary shaft.

8. A solar lighting apparatus according to claim 6 or 7, wherein said support frame member includes a pyramidal frame member structured in ridgelines by light weighted pipes.

9. A solar lighting apparatus according to claim 8, wherein said pyramidal frame member includes a balancing weight.

10. A solar lighting apparatus according to claim 6, further comprising a pivotal part provided at a lower center of said dome and pivotally supporting a lower end of a rotation center shaft of said support frame member.

\* \* \* \* \*